United States Patent [19]
Allison et al.

[11] Patent Number: 4,601,663
[45] Date of Patent: Jul. 22, 1986

[54] HELICOPTER SIMULATOR

[76] Inventors: Alfred E. Allison, P.O. Box 95, Chanute, Kans. 66720; Ronald J. Dillard, 940 Charlotte, Longwood, Fla. 32750

[21] Appl. No.: 744,192

[22] Filed: Jun. 13, 1985

[51] Int. Cl.⁴ ............................................. G09B 9/08
[52] U.S. Cl. ..................................................... 434/33
[58] Field of Search ........................................... 434/33

[56] References Cited

U.S. PATENT DOCUMENTS

| | | |
|---|---|---|
| 3,067,528 | 12/1962 | Agusta .................................. 434/33 |
| 3,131,486 | 5/1964 | Derschmidt ........................... 434/33 |
| 3,164,911 | 1/1965 | Vaughen ................................ 434/33 |
| 3,176,413 | 4/1965 | Dornier et al. ....................... 434/33 |
| 3,225,458 | 12/1965 | Glockl .................................. 434/33 |
| 3,228,119 | 1/1966 | Dornier ................................. 434/33 |
| 3,246,403 | 4/1966 | Vaughen ................................ 434/33 |
| 3,279,096 | 10/1966 | Emigh ................................... 434/33 |
| 3,548,518 | 12/1970 | McRae .................................. 434/33 |
| 3,818,613 | 6/1974 | Julian et al. ......................... 434/33 |

Primary Examiner—William H. Grieb
Attorney, Agent, or Firm—Edwin H. Crabtree

[57] ABSTRACT

A helicopter simulator for simulating actual cockpit procedure and hover technique in a helicopter. The simulator having a helicopter airframe mounted on a platform which rotates on a stationary base. Inside the airframe are hydraulic controls used by the operator for raising and lowering the airframe to simulate taking off and landing, controls for tilting the airframe fore and aft and side to side along with controls for rotating the airframe in a clockwise or counterclockwise manner.

7 Claims, 5 Drawing Figures

HELICOPTER SIMULATOR

BACKGROUND OF THE INVENTION

This invention relates to an aircraft simulator and more particularly, but not by way of limitation, to a helicopter simulator mounted on a rotating platform which simulates the actual operation of a helicopter.

Heretofore there have been various types of aircraft and helicopter simulators described in the following U.S. Pats.: U.S. Pat. No. 3,067,528 to Agusta, U.S. Pat. No. 3,131,486 to Derschmidt, U.S. Pat. No. 3,164,911 to Vaughen, U.S. Pat. No. 3,176,413 to Dornier et al, U.S. Pat. No. 3,225,458 to Glockl, U.S. Pat. No. 3,228,119 to Dornier, U.S. Pat. No. 3,246,403 to Vaughen, U.S. Pat. No. 3,279,096 to Emigh, U.S. Pat. No. 3,548,518 to McRae, U.S. Pat. No. 3,818,613 to Julian et al. None of the above-mentioned patents describe a simulator having the unique features and advantages of the subject simulator as described herein.

SUMMARY OF THE INVENTION

The subject simulator provides a helicopter airframe mounted on a rotating platform which simulates the actual operation of a helicopter during lift off, hover and landing.

The helicopter simulator has different controls for raising and lowering the airframe, rotating the airframe in a clockwise or counterclockwise direction and tilting the airframe fore and aft and side to side.

The simulator is simple in design, inexpensive in construction and is readily adaptable for training both inexperienced and experienced pilots in the operation of a helicopter. The invention can also be used by nonpilots for enjoyment and learning to fly.

The helicopter simulator includes a helicopter airframe mounted on a rotatable platform with the platform received on top of a stationary base. The operator seated in the airframe has a collective control for hydraulically raising and lowering the airframe and platform on the stationary base. Also included is cyclic control which tilts the airframe and in turn the platform fore and aft and side to side. The platform which is rotatably mounted on the stationary base is rotated thereon through the use of foot control pedals which again are hydraulically operated for rotating the platform either in a clockwise or counterclockwise direction.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
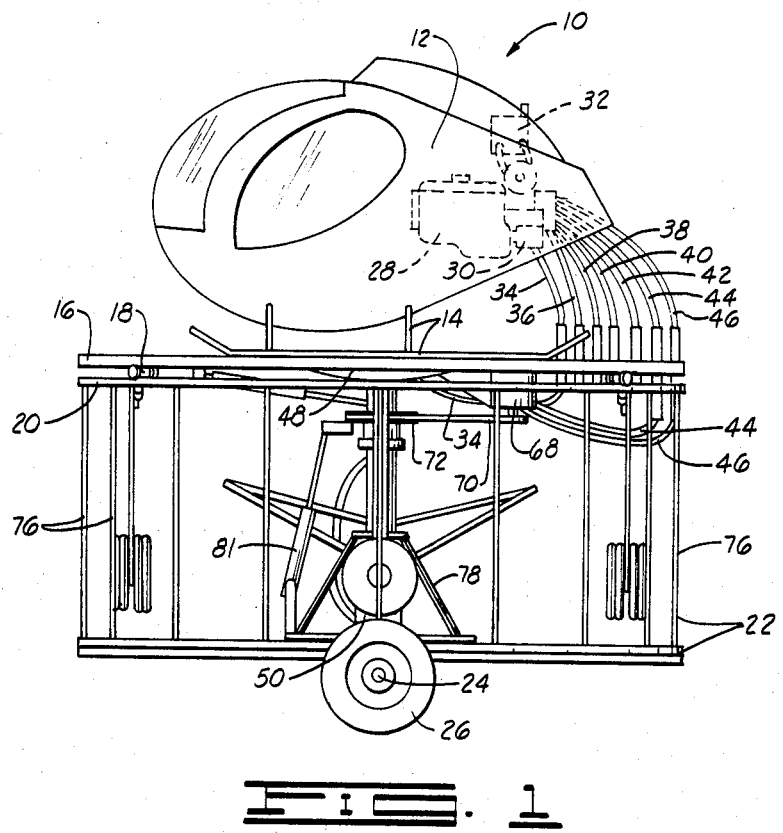
FIG. 1 illustrates a side view of the helicopter simulator with the airframe mounted on the rotatable platform and stationary base.

In FIG. 1 the helicopter simulator is designated by general reference numeral 10. Broadly the simulator 10 includes a helicopter airframe 12 having a pair of skids 14 received on top of a rotatable platform 16 having rollers 18 received on top of a circular ring 20 which is part of a stationary base 22 mounted on a wheeled axle 24 having wheels 26 for transporting the simulator 10 when desired.

Shown in dotted lines mounted inside the airframe 12 is a gasoline powered engine 28 or any other type of drive means connected to and driving a hydraulic pump 30 for pumping hydraulic fluid under pressure from a hydraulic fluid tank 32 through seven hydraulic lines 34, 36, 38, 40, 42, 44 and 46. These lines are connected to quick disconnect fittings attached to the top and bottom of the platform 16. The line 34 is received through an inverted cone 48 mounted on the bottom of the platform 16. The cone 48 is used for stabilizing and supporting the platform 16 on the base 22. The line 34 is shown in greater detail in FIG. 5 for providing hydraulic fluid under pressure to a stationary hydraulic cylinder 50 which is used to raise the platform along with the rollers 18 above the top of the ring 20 for simulating the take-off of the airframe 12. When the pressure is relieved to the cylinder 50, the weight of the platform 16 and airframe 12 lowers the cylinder 50 to simulate landing.

Figure 2:
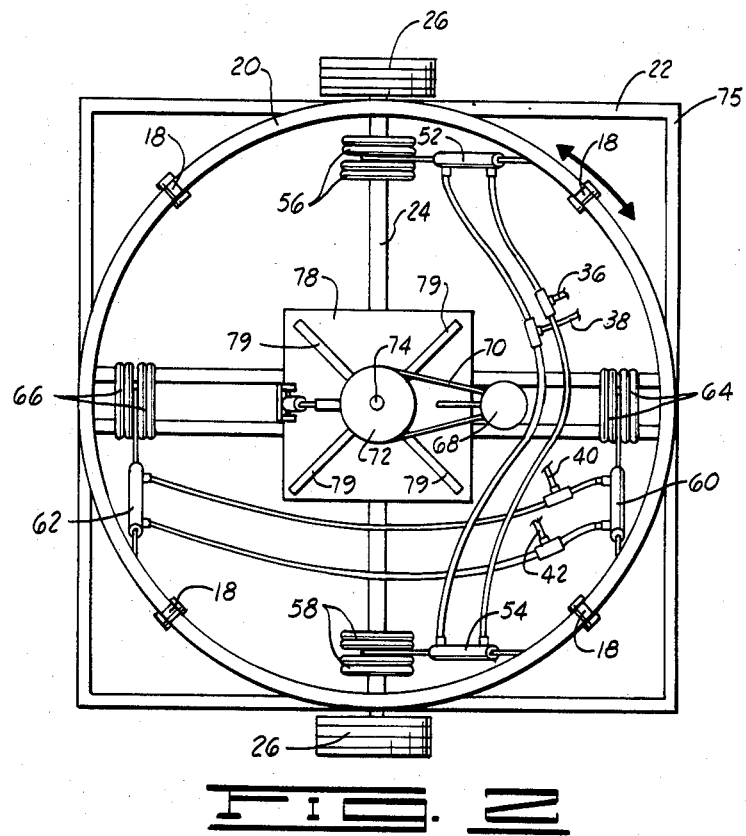
FIG. 2 is a top view of the stationary base with the platform and helicopter airframe removed.

In FIG. 2 the hydraulic lines 36 and 38 provide hydraulic pressure to a pair of double-acting hydraulic cylinders 52 and 54 which move weights 56 and 58 forward and to the left as shown in the drawing or toward a 12 o'clock position for tilting the airframe 12 and platform 16. By reversing the pressure and moving the weights 56 and 58 in an aft position or a six o'clock position and to the right in the drawing, the airframe 12 and platform 16 are tilted backward.

The hydraulic lines 40 and 42 apply hydraulic fluid under pressure to a pair of double-acting hydraulic cylinders 60 and 62 which move weights 64 and 66 upward toward the top of the drawing or a three o'clock position and downward or a nine o'clock position to simulate the tilting of the airframe 12 and platform 16 from side to side.

Figure 5:
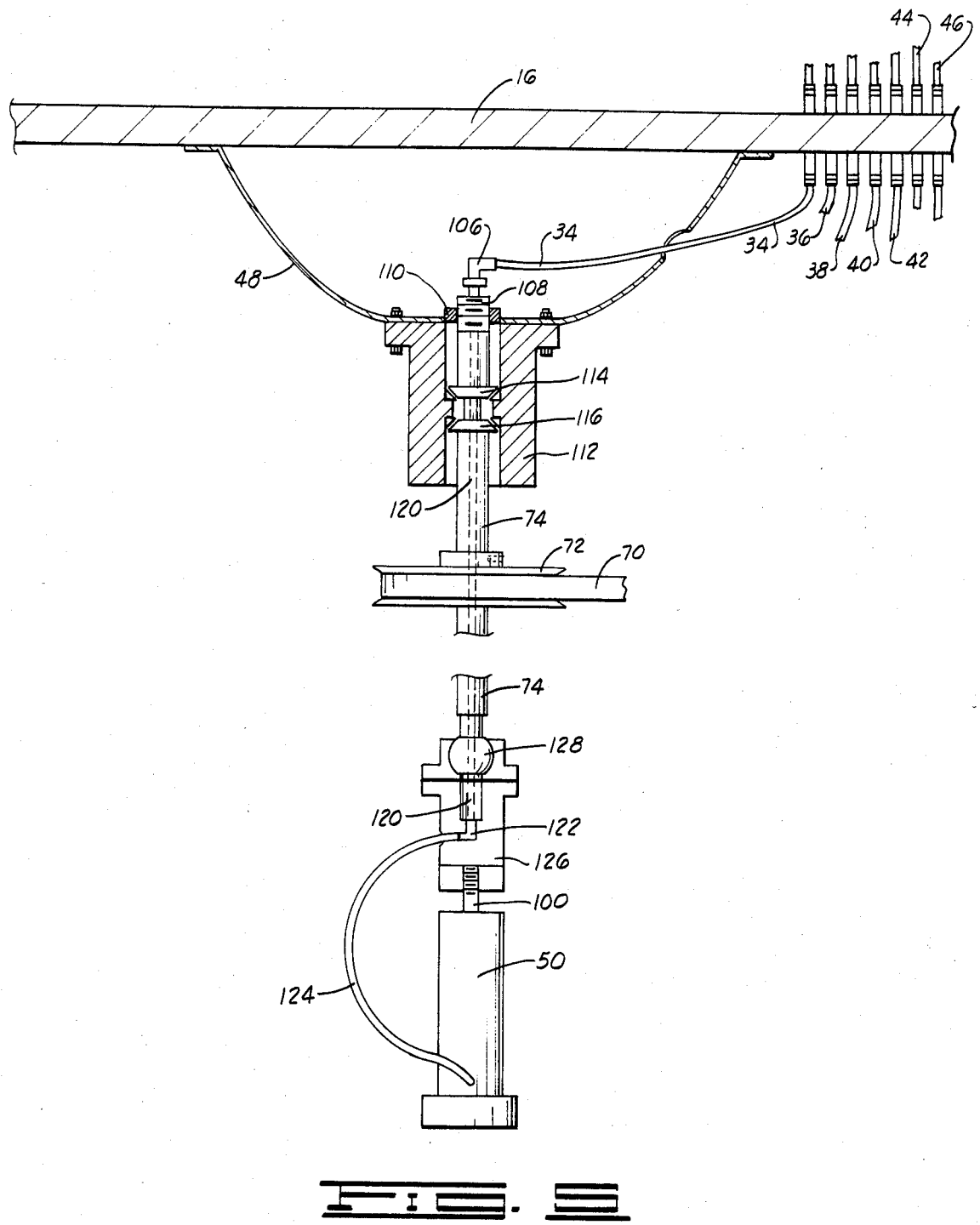
FIG. 5 is an enlarged view of a portion of the platform mounted on a vertical main shaft attached to a pivot ball for allowing the platform to tilt on a pivot base attached to the top of the stationary hydraulic cylinder.

The last two hydraulic lines 44 and 46 are connected to a hydraulic motor 68 which drives an endless belt 70 around a main pulley 72 which is attached to the top of a main shaft 74 shown in FIG. 5. The shaft 74 and pulley 72 during the operation of the simulator 10 remain stationary. The motor 68, when the platform 16 is in a raised position, rotates with the platform 16 along with the airframe 12. This allows the operator of the simulator 10 to rotate in either a clockwise or counterclockwise direction 360° around the stationary base 22.

In FIG. 2 a top view of the stationary base 22 can be seen having a lower angular shaped frame 75 with vertical supports 76. In this view the platform 16 has been removed to show the hydraulic motor 68 and main pulley 72. The pulley 72, stationary shaft 74 and hydraulic cylinder 50 are received on top of an angular shaped mounting plate 78 with supports 79 which is also part of the stationary base 22.

Figure 3:
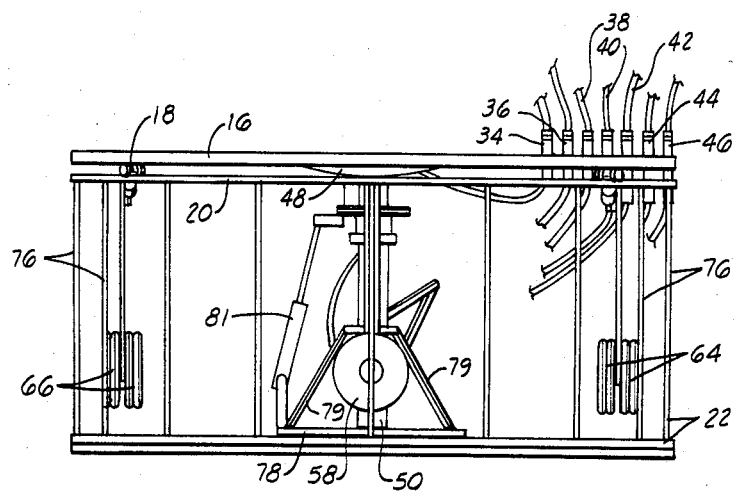
FIG. 3 is a side view of the stationary base.

In FIG. 3 a side view of the stationary base 22 is shown with the airframe 12 removed from the top of the platform 16. In this view the platform 16 is shown with the hydraulic fluid lines extending downwardly therefrom. Attached to the sides of the support hydraulic cylinder 50 are the supports 79 which are used to prevent the rotation of the shaft 74 and cylinder 50 during the operation of the simulator 10. A shock absorber 81 is also attached to the main shaft 74 to reduce shock loading during the operation of the simulator 10.

Figure 4:
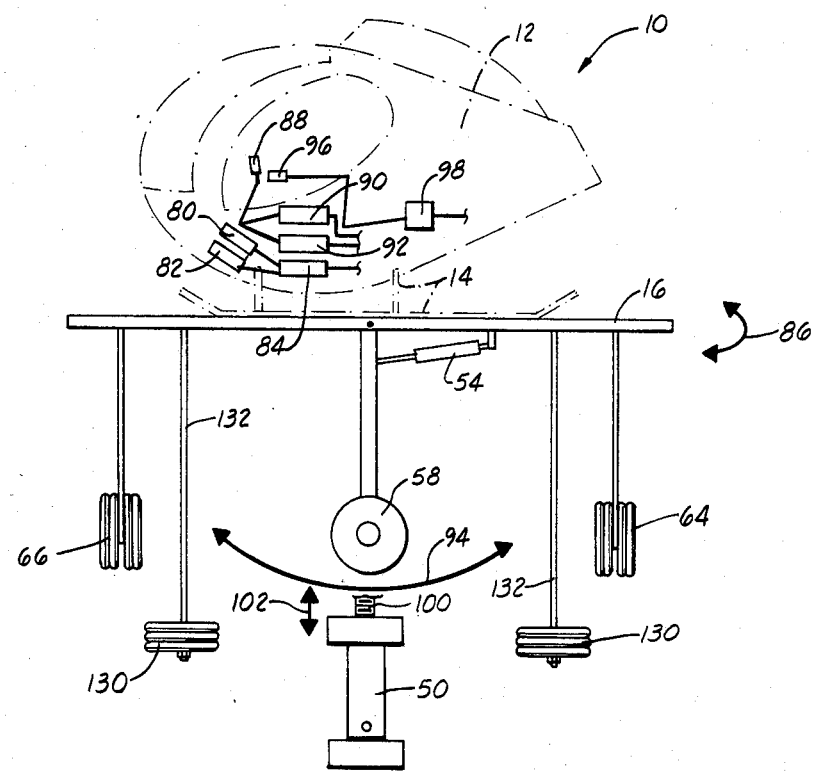
FIG. 4 is a side view of the platform with hydraulically operated weights for tilting the platform and a stationary hydraulic cylinder for raising and lowering the platform.

In FIG. 4 the controls used for operating the simulator 10 inside the airframe 12 are shown in solid lines with the airframe 12 shown in dotted lines. A pair of foot pedals 80 and 82 controlled by the operator of the simulator 10 are connected to a hydraulic valve 84. The valve 84 connected to the hydraulic pump 30 for feeding hydraulic fluid pressure through the fluid lines 44 and 46 to the hydraulic motor 68. By moving the foot pedal 80 the platform 16 and airframe 12 are rotated to the right or in a clockwise direction. By operating the foot pedal 82 the airframe 12 is rotated to the left or in a counterclockwise direction. The clockwise and counterclockwise direction or movement of the platform 16 is indicated by arrow 86.

A second control used by the operator's right hand is a cyclic control handle 88. The handle 88 is connected to a pair of valves 90 and 92 which are in turn connected to the hydraulic pump 30 for applying fluid pressure to the hydraulic lines 36, 38, 40 and 42 for moving the double acting hydraulic cylinders 52, 54, 60 and 62. The tilt of the platform 16 is indicated by arrow 94. It can also be appreciated by moving the cyclic control handle 88 between a fore and aft position or side to side position that the platform 16 and airframe 12 can be tilted, for example, toward a 1:00 o'clock position, an 11:00 o'clock position or any other support position.

Also shown in FIG. 4 is the support hydraulic cylinder 50 which is operated by a collective control handle 96. The handle 96 is connected to a hydraulic valve 98 that is in turn connected to the hydraulic pump 30 for applying fluid pressure through fluid lines 34. This fluid pressure raises a hydraulic ram 100 of the cylinder 50 which raises the platform 16 above the circular ring 20. The collective control handle 96 is operated by the operator's left hand and when lowered the fluid pressure is relieved through the valve 98 and through the weight of the airframe 12 and platform 16 the fluid pressure is bled from the hydraulic cylinder 50 and the platform 16 is lowered on top of the circular ring 20. This movement is indicated by arrow 102.

In FIG. 5 an enlarged view of a portion of the platform 16 is shown with inverted cone 48 receiving a portion of the hydraulic fluid line 34 which is connected to a swivel fitting 106. This fitting is attached to the top of a threaded end 108 of the main shaft 74 and secured thereto by a threaded nut 110. The main shaft 74 is received in a bearing housing 112 having a pair or tapered roller bearings 114 and 116. These bearings allow the platform 16 to be supported on top of the main shaft 74 and to be rotated thereon. Hydraulic fluid from the line 34 is fed through a bore 120 which extends downwardly through the center of the shaft and through a second hydraulic swivel fitting 112. This fitting is connected to hydraulic line 124 for supplying fluid under pressure to the stationary hydraulic cylinder 50. Supported on top of the ram 100 and connected to the bottom of the main shaft 74 is a pivot ball housing 126 having a pivot ball 128. The ball 128 is received around the lower portion of the main shaft 74 and allows the shaft along with the platform 16 to be tilted thereon. It can be appreciated that this structure allows the entire platform 16 along with the airframe 12 to be tilted at various angles when the hydraulic cylinders 52, 54, 60 and 62 are activated by the use of the cyclic control handle 88. The ram 100, also while not shown, includes a cam grove therein to help simulate the torque of the helicopter engine as the platform 16 and airframe 10 are raised and lowered.

The operation of the foot pedals 80 and 82, the cyclic control handle 88 and the collective control handle 96 allow the operator seated in the airframe 12 to simulate the actual flight of a helicopter. This simulation greatly aides in the training of both experienced and inexperienced pilots prior to the actual operation of a helicopter in flight. Further, in FIG. 4, a plurality of counter blance weights 130 may be added and suspended by rods 132 from the platform 16. The weights 130 can be spaced an equal distance from the weights 56, 58, 64 and 66 so as not to interfere with other equipment of the simulator 10 and located so as to fine tune the simulator 10 to perform like different types of helicopters.

While not shown in the drawings, four hydraulic tilting cylinders may be attached to the four corners of base 22 with hydraulic hoses connected to valve controls on an instructors control panel. The control panel will also include gauges, on-off switch, circuit breaker and hydraulic pump connected to the hoses. The control panel will allow a flight instructor to induce problems into the simulator 10 for the student to correct. The instructor would be operating the panel adjacent the simulator 10.

Changes may be made in the construction and arrangement of the parts or elements of the embodiments as described herein without departing from the spirit or scope of the invention defined in the following claims.

What is claimed is:

1. A helicopter simulator for simulating actual flight in a helicopter, the simulator comprising:

a helicopter airframe mounted on a rotatable platform, the platform received on a stationary base;

a hydraulic motor having hydraulic lines connected to a hydraulic pump operated in the airframe and connected to a first instrument control, the hydraulic motor connected to a main support shaft attached to the platform, the motor rotating the platform on top of the main support shaft;

lift means connected to the platform and the base for raising and lowering the platform on the base and connected to a second instrument control in the airframe; and a fore and aft, right and left tilt means mounted on the platform for tilting the platform on the base and connected to a third instrument control in the airframe.

2. The simulator as described in claim 1 wherein the lift means is a stationary hydraulic cylinder mounted on the base, the stationary hydraulic cylinder connected to the bottom of the main support shaft, when the second instrument control is activated the main support shaft raises and lowers the platform above the stationary base.

3. The simulator as described in claim 1 wherein the fore and aft, right and left tilt means are four hydraulic cylinders connected to the hydraulic pump, the hydraulic cylinders connected weights suspended from the bottom of the platform, when the hydraulic cylinders are activated by the third instrument control the weights are moved fore, aft or side to side for tilting the platform in various directions during the operation of the simulator.

4. A helicopter simulator for simulating actual flight in a helicopter, the simulator comprising:
- a helicopter airframe mounted on a rotatable platform, the platform received on top of a circular ring mounted on top of a stationary base, the airframe housing a motor means attached to a hydraulic pump connected to a hydraulic fluid tank;
- a hydraulic motor mounted on the bottom of the platform and having a pair of hydraulic lines connected to the hydraulic pump in the airframe, the hydraulic motor connected to a first instrument control in the airframe and when activated rotating the platform and airframe above the stationary base;
- a stationary hydraulic cylinder attached to the stationary base and to the lower end of a vertical main support shaft, the shaft attached to the bottom of the platform, the bottom of the platform supported on the top of the shaft by bearing support means for allowing the platform to rotate on top of the shaft and supported thereon, the stationary hydraulic cylinder having a hydraulic line connected to the hydraulic pump and activated by a second instrument control in the airframe for raising the platform above the circular ring on top of the stationary base; and
- a plurality of hydraulic cylinders attached to the bottom of the platform and attached to weights for changing the center of gravity of the platform by moving the weights side to side and fore and aft, the hydraulic cylinders connected to hydraulic lines attached to the hydraulic pump in the airframe and controlled by a third instrument control in the airframe for activating the hydraulic cylinders and tilting the airframe and platform.

5. The simulator as described in claim 4 wherein the first instrument control is a pair of foot pedals attached to a hydraulic fluid valve which in turn is connected to the hydraulic pump, by activating the foot pedals the hydraulic motor rotates the platform and airframe in a counterclockwise or clockwise direction.

6. The simulator as described in claim 4 wherein the second instrument control is a collective control handle connected to a hydraulic valve attached to the hydraulic pump for applying fluid pressure to the stationary cylinder and applying fluid pressure for raising the platform above the top of the stationary base.

7. The simulator as described in claim 4 wherein the third instrument control is a cyclic control handle connected to a pair of hydraulic valves which in turn are connected to the hydraulic pump for applying pressure to the four hydraulic cylinders and tilting the platform and airframe fore and aft or side to side.

* * * * *